(No Model.) 2 Sheets—Sheet 1.
B. MELLINGER.
HAY RAKE.
No. 586,447. Patented July 13, 1897.
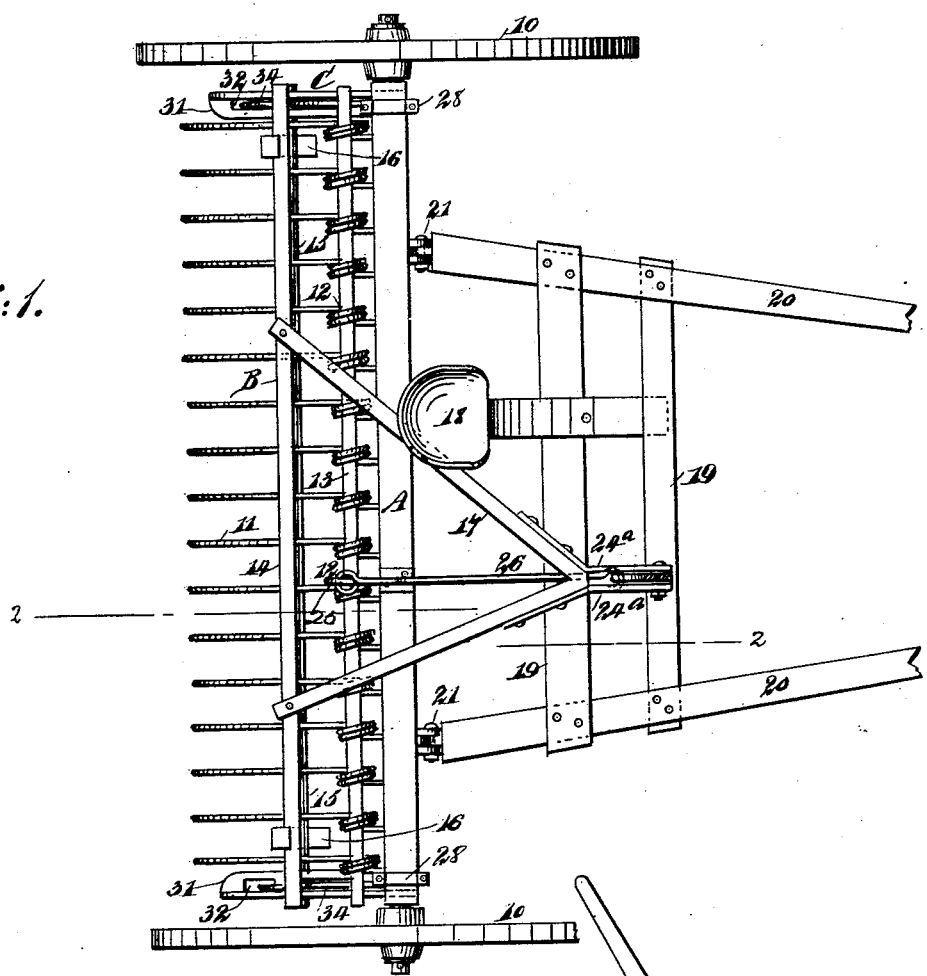
fig: 1.
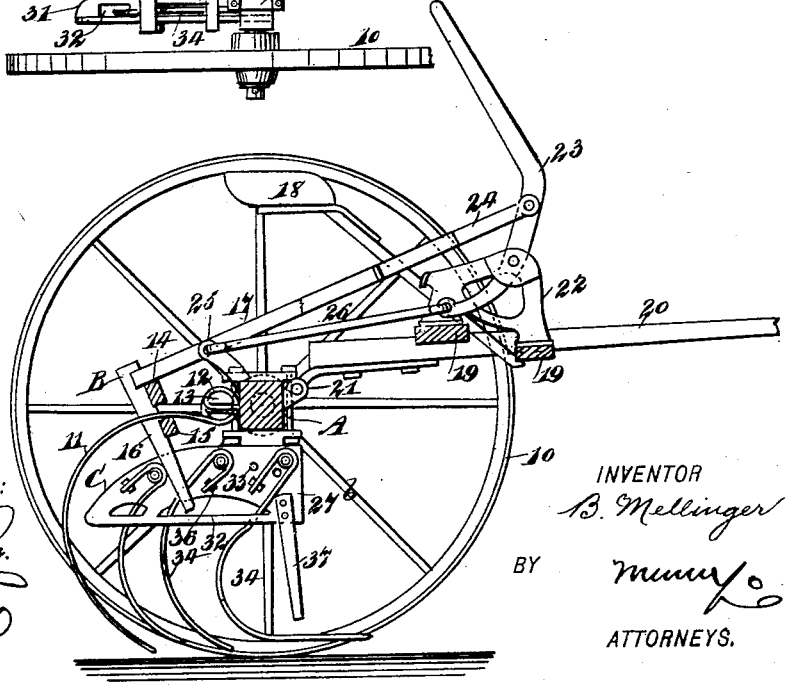
fig: 2.
WITNESSES:
INVENTOR
B. Mellinger
BY
ATTORNEYS.

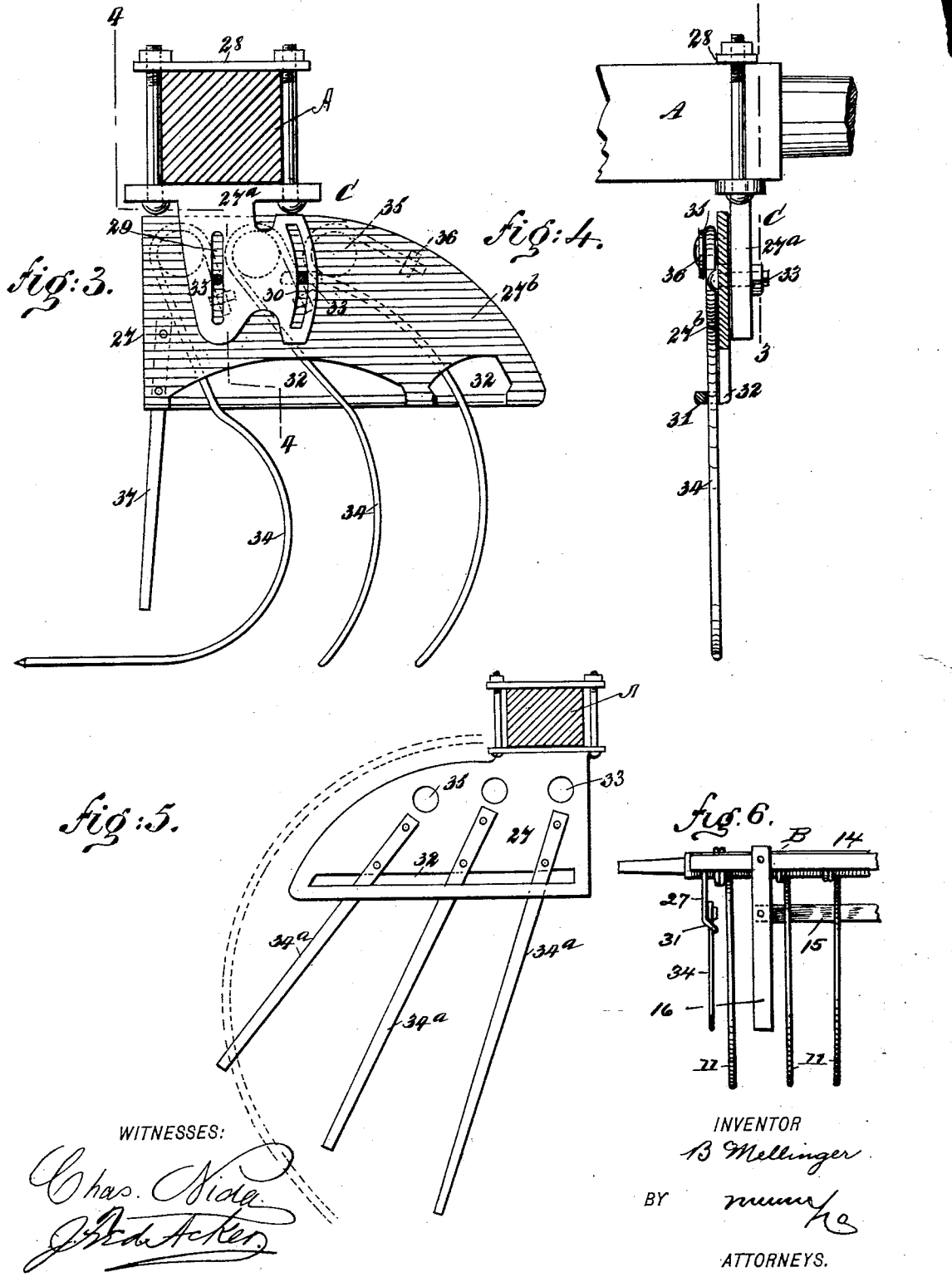

UNITED STATES PATENT OFFICE.

BENJAMIN MELLINGER, OF TOPEKA, KANSAS, ASSIGNOR OF ONE-HALF TO SAMUEL T. MELLINGER, OF SAME PLACE.

HAY-RAKE.

SPECIFICATION forming part of Letters Patent No. 586,447, dated July 13, 1897.

Application filed May 19, 1896. Serial No. 592,128. (No model.)

*To all whom it may concern:*

Be it known that I, BENJAMIN MELLINGER, of Topeka, in the county of Shawnee and State of Kansas, have invented a new and useful Improvement in Hay-Rakes, of which the following is a full, clear, and exact description.

My invention relates to an improvement in horse hay-rakes; and it has for its object, primarily, to provide guards for the ends of the rake which will effectually prevent the hay gathered up by the rake-teeth from being spilled at the ends of the row of teeth; and a further object of this invention is to provide a cleaning device for the teeth which will operate in connection with a lever to raise the teeth, cleaning them at the same time.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a plan view of the improved horse hay-rake. Fig. 2 is a vertical section taken practically on the line 2 2 of Fig. 1. Fig. 3 is an enlarged section taken practically on the line 3 3 of Fig. 4, illustrating the improved guard from an inside point of view. Fig. 4 is a section taken substantially on the line 4 4 of Fig. 3. Fig. 5 is a detail view of a slightly-modified form of the guard, and Fig. 6 is a detail rear view of one end of the rake.

In carrying out the invention the axle A of the rake is practically its head and is provided at each end with a loosely-mounted traction-wheel 10, and the rake-teeth 11 are secured to this axle, extending downwardly and rearwardly therefrom in the usual manner, and each tooth is provided adjacent to the axle with a coil or coils 12, formed in it, and a stiffening-rod 13 is passed through the coils of all of the rake-teeth. It will therefore be observed that the axle A is virtually the head of the rake and that the wheels are mounted on the head.

A cleaning device B is employed in connection with the rake-teeth, being adapted to elevate the teeth as well as to clean them. This cleaning device consists of a top bar 14, which extends over the entire line of teeth and beyond the end teeth of the line, and a lower bar 15, which is located below the teeth, substantially parallel with the upper bar, as shown in Fig. 2. The lower bar is not as long as the upper one, extending only to the outer teeth of the line of rake-teeth, and the two bars are connected at each end by a downwardly-extending arm 16, the said arms being located between the end teeth and the teeth next thereto, as shown best in Fig. 1.

The cleaner B is held in position by a substantially V-shaped tongue 17, the angular portion of the tongue being presented to the front, and one member of the tongue is longer than the other in order that the tongue may be carried to the right of the driver's seat 18, the latter being attached to one or both of two cross-bars 19, connecting the thills or shafts 20, the said thills or shafts being coupled to the rake-head at the upper portion of its front face, and one coupling is located at each side of the center of the said head.

A standard 22 is preferably secured upon the cross-bars 19 at the right of the driver's seat, and a lever 23 is fulcrumed upon this standard. The lever is somewhat angular, and in its normal position the handle has preferably a rearward and upward inclination, while its lower end is curved or given a rearward and downward inclination. The contracted end of the tongue 17 is connected with the lever 23, which is practically a dumping-lever, the connecting point being near the junction of the body with the handle of the lever, and the attachment is preferably accomplished through the medium of two angular straps or plates 24ª, which are secured to opposite sides of the contracted portion of the tongue and carried forward one at each side of the lever 23, to which they are to be secured.

The lower extremity of the dumping-lever 23 is connected by a link 26 with an arm 25, projected rearwardly from the head of the rake. In the operation of dumping the rake the lever 23 is carried rearwardly, which causes the rake-head to turn in the hubs of the wheels and likewise causes the cleaner—namely, the bars 14 and 15—to be carried rearwardly and slightly in an upward direction, and owing to the curvature of the teeth and their passage between the bars 14 and 15 in the cleaner the rake-teeth will be raised from the ground, and any hay that may cling to the teeth will be removed therefrom during the rearward and elevating movement of the cleaner.

In order to prevent the scattering or loss of hay at the ends of the row of teeth, I provide a guard C at each of said ends. The aforesaid guard comprises a shield 27 and teeth 34, connected with the shield. The shield, as shown in Figs. 3 and 4, is preferably made in two sections—an attaching-section 27$^a$ and a body or tooth-carrying section 27$^b$. The body-section 27$^a$ of each guard is attached to the rake-head adjacent to the wheels by means of a clip 28 of any approved construction, and the said receiving-section is preferably provided with a forward straight slot 29, made vertically therein, and a corresponding curved slot 30, located near the rear of the said section, as is particularly shown in Fig. 3. The body-section 27$^b$ of the shield is preferably made straight at the front and at the bottom, its upper edge being curved from the front downward to meet the bottom, and the said section 27$^b$ extends rearwardly a predetermined distance beyond the attaching-section to a point near the outer rake-teeth.

The body-section of the shield is provided with an inwardly-extending flange 31 at the bottom, and one or more horizontal openings 32 are made at the bottom of this section of the shield, and likewise in the flange. The teeth 34, to be attached to the shield and forming a portion of the guard, are preferably spring-teeth and are coiled or passed around studs or bosses 35, formed upon the inner face of the top portion of the body of the shield, the upper ends of the teeth being carried downward and rearward to an engagement with a keeper 36, likewise secured to the body-section of the shield, while the body portions of the teeth are curved downwardly and forwardly and pass through the openings 32 in the bottom of the shield-body in the flange thereof.

Preferably the forward tooth of a guard is provided with a horizontal lower end adapted to travel not upon the ground, but substantially parallel therewith, and also preferably a wooden tooth 37, carried downward in a substantially vertical manner, is located at the extreme forward end of the body portion of each shield.

The body portion of each shield is adjustably attached to the attaching-section by passing bolts 33, provided with suitable nuts, through the body portions of the shields and the slots in the retaining portions. Under this construction it will be observed that a shield may be adjusted vertically, according to the height of the wheels, or given any desired angle forwardly or rearwardly.

In Fig. 5 I have illustrated a slight modification in the formation of the shield in which the shield is made in one piece, the slot 32 being continuous, and wooden guard-teeth 34$^a$ are secured to the shield instead of the spring-teeth 34 shown in Fig. 3, and the shield is secured directly to the rake-head.

Having thus described my invention, I claim as new and desire to secure by Letters Patent—

1. In a horse hay-rake, a guard located at each end of the row of teeth, each guard consisting of a shield constructed in adjustable sections, and spring-teeth carried by one of the sections of the shield, the said teeth being curved downwardly and forwardly, substantially as described.

2. In a horse hay-rake, a guard for the ends of the rake, the said guard comprising a shield formed of adjustable sections and attached to the head of the rake to project rearwardly therefrom, spring-teeth rearwardly and downwardly curved from the said shield over the space between the end rake-teeth and forward portion of the rake-head, and a substantially straight and rigid tooth located at the forward end of the shield, the end teeth serving as a barrier against the outward passage of the hay while gathered up by the teeth of the rake, substantially as described.

3. In a horse hay-rake, the combination, with the rake-head and its teeth, of a guard located at each end of the line of rake-teeth, each guard comprising a shield consisting of a retaining-section attached to the rake-head and provided with a vertical and a curved slot, and a body-section having an apertured flange at its lower edge and provided with locking devices passed through the slots in the retaining-section of the shield, and teeth secured to the body-section of the shield, projecting through the apertured flange and extending downwardly and forwardly therefrom, as and for the purpose set forth.

BENJAMIN MELLINGER.

Witnesses:
JAS. McKEE,
F. A. HERZOG.